(12) United States Patent
Gupta et al.

(10) Patent No.: US 10,275,955 B2
(45) Date of Patent: Apr. 30, 2019

(54) METHODS AND SYSTEMS FOR UTILIZING INFORMATION COLLECTED FROM MULTIPLE SENSORS TO PROTECT A VEHICLE FROM MALWARE AND ATTACKS

(71) Applicant: QUALCOMM Incorporated, San Diego, CA (US)

(72) Inventors: Rajarshi Gupta, Sunnyvale, CA (US); Saumitra Mohan Das, Santa Clara, CA (US); Govindarajan Krishnamurthi, Palo Alto, CA (US); Seyed Ali Ahmadzadeh, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/081,450

(22) Filed: Mar. 25, 2016

(65) Prior Publication Data

US 2017/0278323 A1    Sep. 28, 2017

(51) Int. Cl.
*G07C 5/08* (2006.01)
*G07C 5/00* (2006.01)
(Continued)

(52) U.S. Cl.
CPC .......... *G07C 5/0841* (2013.01); *B60W 50/14* (2013.01); *G06F 21/50* (2013.01); *G07C 5/008* (2013.01);
(Continued)

(58) Field of Classification Search
CPC ................. G06F 21/561; G06F 21/566; G06F 2221/033; G06F 21/577; G06F 2221/1433;
(Continued)

(56) References Cited

U.S. PATENT DOCUMENTS

| 8,903,593 B1 | 12/2014 | Addepalli et al. |
| 2013/0145482 A1 | 6/2013 | Ricci et al. |

(Continued)

FOREIGN PATENT DOCUMENTS

| WO | 2015057979 A1 | 4/2015 | |
| WO | WO2015057979 A1 * | 4/2015 | ............. G06F 21/10 |

OTHER PUBLICATIONS

International Search Report and Written Opinion—PCT/US2017/019403—ISA/EPO—May 19, 2017.

(Continued)

*Primary Examiner* — Yuen H Wong
(74) *Attorney, Agent, or Firm* — The Marbury Law Group, PLLC

(57) ABSTRACT

Various embodiments include methods, and computing devices implementing the methods, for analyzing sensor information to identify an abnormal vehicle behavior. A computing device may monitor sensors (e.g., a closely-integrated vehicle sensor, a loosely-integrated vehicle sensor, a non-vehicle sensor, etc.) in the vehicle to collect the sensor information, analyze the collected sensor information to generate an analysis result, and use the generated analysis result to determine whether a behavior of the vehicle is abnormal. The computing device may also generate a communication message in response to determining that the behavior of the vehicle is abnormal, and send the generated communication message to an external entity.

28 Claims, 7 Drawing Sheets

(51) Int. Cl.
| | |
|---|---|
| *H04W 64/00* | (2009.01) |
| *B60W 50/14* | (2012.01) |
| *G06F 21/50* | (2013.01) |
| *H04W 12/12* | (2009.01) |
| *H04L 29/06* | (2006.01) |
| *H04W 4/40* | (2018.01) |

(52) U.S. Cl.
CPC ......... *H04L 63/1408* (2013.01); *H04W 12/12* (2013.01); *H04W 64/00* (2013.01); *H04W 4/40* (2018.02)

(58) Field of Classification Search
CPC ........... H04L 63/1416; H04L 63/1433; H04W 12/10; H04W 12/12; H04W 24/06
See application file for complete search history.

(56) References Cited

U.S. PATENT DOCUMENTS

| | | |
|---|---|---|
| 2014/0047255 A1 | 2/2014 | Sasaki et al. |
| 2014/0250531 A1 | 9/2014 | Moeller et al. |
| 2015/0195297 A1 | 7/2015 | Ben et al. |
| 2015/0271201 A1 | 9/2015 | Ruvio et al. |
| 2016/0277435 A1* | 9/2016 | Salajegheh ......... H04L 63/1416 |

OTHER PUBLICATIONS

Nilsson D.K., et al., "A Defense-in-Depth Approach to Securing the Wireless Vehicle Infrastructure", Journal of Networks, Sep. 7, 2009 (Sep. 7, 2009), XP055254484, vol. 4, No. 7, pp. 552-564, FIISSN: 1796-2056, DOI:10.4304/jnw.4.7.552-564.

* cited by examiner

METHODS AND SYSTEMS FOR UTILIZING INFORMATION COLLECTED FROM MULTIPLE SENSORS TO PROTECT A VEHICLE FROM MALWARE AND ATTACKS

BACKGROUND

In recent years, technology companies have begun developing and implementing technologies that assist drivers in avoiding accidents and enabling an automobile to drive itself. So called "self-driving cars" include sophisticated sensor and processing systems that control the vehicle based on information collected from the car's sensors, processors, and other electronics, in combination with information (e.g., maps, traffic reports, etc.) received from external networks (e.g., the "Cloud"). As self-driving and driver-assisting technologies grow in popularity and use, so will the importance of protecting motor vehicles from malfunction, malware and attacks. Due to these emerging trends, new and improved solutions that better identify, prevent and respond to misinformation, malware and cyber attacks on modern vehicles, such as autonomous vehicles and self driving cars, will be beneficial to consumers.

SUMMARY

The various embodiments include methods of analyzing sensor information to identify an abnormal vehicle behavior, including monitoring via a processor a plurality of sensors in close proximity to the vehicle to collect sensor information, analyzing the collected sensor information to generate an analysis result, and using the generated analysis result to determine whether a behavior of the vehicle is abnormal. Some embodiments may include generating a communication message in response to determining that the behavior of the vehicle is abnormal, and sending the generated communication message to an external entity.

In some embodiments, analyzing the collected sensor information to generate the analysis result may include comparing sensor information collected from a mobile device sensor to sensor information collected from a vehicle sensor. In some embodiments, analyzing the collected sensor information to generate the analysis result may include comparing sensor information collected from two or more of a closely-integrated vehicle sensor, a loosely-integrated vehicle sensor, and a non-vehicle sensor. In some embodiments, analyzing the collected sensor information to generate the analysis result may include comparing sensor information collected from a first type of sensor to sensor information collected from a second type of sensor.

In some embodiments, analyzing the collected sensor information to generate the analysis result may include generating a behavior vector based on the collected sensor information, and applying the generated behavior vector to a machine learning classifier model to generate the analysis result.

In some embodiments, the processor may be a mobile device processor in a mobile device configured to perform operations further including determining by the mobile device processor whether the mobile device is inside the vehicle, and activating a monitoring and analysis system to collect and analyze the sensor information in response to determining that the mobile device is inside the vehicle. In some embodiments, the processor may be a vehicle processor in the vehicle configured to perform operations further including determining by the vehicle processor whether a mobile device is inside the vehicle, establishing a communication link to the mobile device in response to determining that the mobile device is inside the vehicle, and receiving mobile device sensor information via the communication link.

Further embodiments include a computing device that includes a processor configured with processor-executable instructions to perform operations of the methods summarized above. Further embodiments include a non-transitory computer readable storage medium having stored thereon processor-executable software instructions configured to cause a computing device processor to perform operations. Further embodiments include a computing device having means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
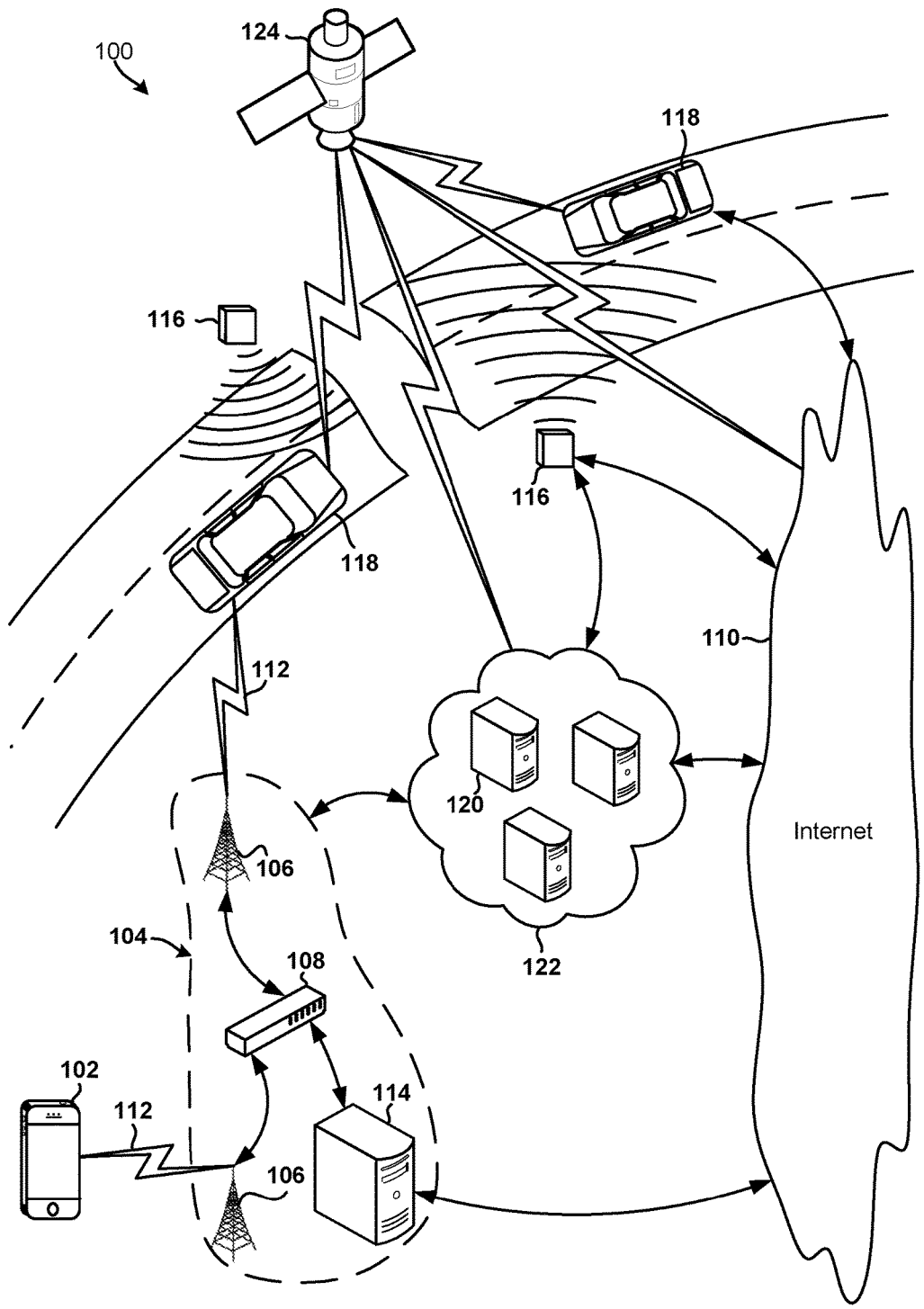
FIG. 1 is a communication system block diagram illustrating network components in an example vehicle-based system that is suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, the various embodiments include methods, as well as computing systems configured to execute the methods, for monitoring and analysis of sensor information in a vehicle to efficiently identify, prevent, correct, or otherwise respond to various abnormal conditions and behaviors in/of the vehicle, such as malware, cyber attacks, sensor malfunctions, vehicle malfunctions, vehicle-based attacks (e.g., odometer attacks, velocity attacks, gear attacks, acceleration-brake attacks, door attacks, hotwiring attacks, etc.) and operator fraud. A computing system may be configured to monitor a sensor in or near the vehicle to collect the sensor information, analyze the collected sensor information to generate an analysis result, determine whether a behavior of the vehicle is abnormal based on the generated analysis result. The computing system may generate a communication message in response to determining that the behavior of the vehicle is abnormal, and send the generated communication message to an external entity for analysis.

The computing system may be, or may be implemented in, a mobile computing device, the vehicle's control systems, or a combination thereof. The monitored sensors may include any combination of closely-integrated vehicle sensors (e.g., brake sensor, etc.), loosely-integrated vehicle sensors (e.g., after market GPS, dash mounted camera, etc.), and non-vehicle sensors (e.g., accelerometer in a passenger's mobile device, etc.).

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

Over the past several years, the modern automobile has been transformed from a self-propelled mechanical vehicle into a powerful and complex electro-mechanical system that includes a large number of sensors, processors, and SOCs that control many of the vehicle's functions, features, and operations. Modern vehicles now also are equipped with a vehicle control system, which may be configured to collect and use information from the vehicle's various systems and sensors to automate all or a portion of the vehicle's operations.

For example, manufacturers now equip their automobiles with an Advanced Driver Assistance System (ADAS) that automates, adapts, or enhances the vehicle's operations. The ADAS may use information collected from the automobile's sensors (e.g., accelerometer, radar, lidar, geospatial positioning, etc.) to automatically detect a potential road hazard, and assume control over all or a portion of the vehicle's operations (e.g., braking, steering, etc.) to avoid detected hazards. Features and functions commonly associated with an ADAS include adaptive cruise control, automated lane detection, lane departure warning, automated steering, automated braking, and automated accident avoidance.

In a world of autonomous and semi-autonomous vehicles, the introduction of malware or unauthorized access to control algorithms could be catastrophic. In order to protect the vehicles from malware and attacks, and make better or more informed decisions, the vehicle (or a mobile device in the vehicle) may be configured to monitor and analyze information collected from various independent or heterogeneous systems and sensors to ensure proper or expected operation before making a control decision or taking a responsive action.

In addition, there are currently a variety of known automobile-specific attacks, including odometer-based attacks, velocity-based attacks, gear-based attacks, acceleration-brake attacks, door-based attacks, and hotwiring attacks. An odometer attack alters the distance that the car's sensors report (e.g., for taxis, etc.). A velocity attack alters the speed in which the car's sensors report (e.g., to commit fraud on insurance companies). A gear attack forces the car to improperly change gears. An acceleration-brake attack may force the car to improperly apply the brakes (e.g., by triggering the collision avoidance system, etc.). A door attack may unlock the car's door without the user's consent, even when the car is moving. A hotwiring attack causes the car to turn on without the key (or the owner's knowledge/consent). Detecting and preventing these and other attacks will be beneficial to owners/users of automobiles.

In the various embodiments, a computing system in a vehicle may be configured monitor a wide variety of sensors (including sensors on mobile devices) to collect sensor information, compare the collected sensor information to information that is collected from other sensors (or to data/behavior models, machine learning classifier models, etc.) to generate a comparison/analysis result, and use the generated results to identify an abnormal or suspicious vehicle behavior (or determine whether the vehicle is operating as expected, in accordance with its normal operating patterns, etc.). The computing system may select and perform various actuation operations to report, heal, cure, isolate, fix, or otherwise respond to identified problems, abnormalities, and suspicious vehicle behaviors. For example, the computing system may generate and send a communication message (e.g., email, SMS, etc.) to the vehicle's owner, a software manufacturer, the vehicle's manufacturer, a government agency (e.g., National Highway Traffic Safety Administration (NHTSA), local police, etc.), or other external entities to notify them of a suspicious or abnormality condition or behavior so that they may take a responsive action.

In some embodiments, the computing system may be, or may be implemented or included in, a mobile device. The mobile device may be configured to send a control message to the vehicle that includes information suitable for causing select sensors (or the vehicle control system) to activate, collecting sensor information, and sending the collected information to the mobile device. The mobile device may also be configured to intelligently determine whether it is in a vehicle, and send the control message to the vehicle in response to determining that it is in the vehicle.

The mobile device may determine whether it is in a vehicle based on information collected from sensors (e.g., accelerometers, microphones, etc.) and systems (e.g., GPS receivers, cellular network transceivers, etc.) of the mobile device. For example, the mobile device may use information collected from communications circuitry to determine whether a short-range communication link (e.g., Bluetooth link, etc.) can be established to the vehicle, and determine that the mobile device is inside a vehicle when it is possible to establish such a short-range communication link. The mobile device may also determine that it is inside the vehicle based on information collected from accelerometers and a GPS receiver within the mobile device when accelerometer and location data indicate that the mobile device is traveling at a relatively high speed (i.e., greater than walking or running speed) on or near a roadway.

In response to the determining that the mobile device is inside a vehicle, the mobile device may activate a monitoring and analysis system (e.g., a monitoring and analysis application) to collect sensor information from the vehicle's sensors (e.g., closely-integrated vehicle sensors, loosely-integrated vehicle sensors, etc.) and/or from non-vehicle sensors (e.g., sensors in the mobile device, sensors in wearable devices, fixed road sensors, etc.). The mobile device may compare or analyze the collected sensor information to generate the comparison result, and use the comparison result to identify and report suspicious or abnormal conditions or behaviors. For example, the mobile device may activate the monitoring and analysis system to collect sensor information from the vehicle's odometer (a closely-integrated vehicle sensor), collect sensor information from an accelerometer in the mobile device (a non-vehicle sensor), and compare/analyze the odometer and accelerometer readings to determine whether the vehicle is traveling at approximately the same speed as indicated by the vehicle's speedometer. The mobile device may send a communication message to a taxi or "mobile ride hail" company, such as UBER or LYFT, to notify them of a detected inconsistency (e.g., when the speed indicated by the vehicle speedometer deviate significantly from speed is measured by a mobile device's GPS receiver). Such a report may enable the company to determine whether the vehicle has been hacked or is experiencing an odometer-based attack.

In some embodiments, the computing system may be implemented or included in the vehicle's control system. As an example, the vehicle's control system may be configured to collect and compare sensor information from the vehicle's wheel rotation sensor (a closely-integrated vehicle sensor) and the vehicle's aftermarket geospatial positioning system (GPS) system (a loosely-integrated vehicle sensor) and an accelerometer in a passenger's the mobile device (a non-vehicle sensor). If the sensor information collected from the vehicle's wheel rotation sensor indicates that the vehicle is traveling at a much higher velocity than the sensor information collected from the accelerometer and aftermarket GPS system, the vehicle's control system may determine that the vehicle is experiencing an acceleration-brake attack, display a warning message to the driver, and deactivate the vehicle's automated braking and/or accident avoidance systems.

In various embodiments, the computing system may be configured to use machine learning techniques to compare or analyze sensor information that is collected from different types of sensors. For example, the computing system may be configured to generate a first behavior vector based on sensor information that is collected from a first type of sensor, and generate a second behavior vector based on sensor information that is collected from a second type of sensor. The computing system may apply the first behavior vector to a first classifier/behavior model to generate a first value, and apply the second behavior vector to a second classifier/behavior model to generate a second value. Based on this comparison, the computing device may compute a difference value that identifies or reflects the difference between the first value and the second value, and compare the difference value to a threshold value to determine whether the difference value indicates a problem. The computing system may mark/flag the sensor information (or a behavior associated with the collected sensor information) as suspicious or abnormal in response to determining that the difference between the first value and the second value exceeds the threshold value. The computing system may also determine whether to perform a responsive action based whether the sensor information (or behavior of the vehicle) is marked as suspicious/abnormal.

In various implementations, a processor in the computing system may be coupled to all (or many) of the vehicle's sensors and systems via wired and/or wireless links, including the mobile devices of its passengers. The processor may collect information from large number of diverse and disparate sensors/systems, and use a combination of the collected information to determine whether there are abnormalities in sensor outputs, system outputs, system ops, etc.

For example, the processor may collect information from the odometer and a GPS system (the vehicle's GPS, GPS in a passenger's phone, etc.), and compare the results to determine whether the distance reported by the odometer sensor is consistent with a distance traveled, as indicated by GPS data. Similarly, the processor may compare information collected from the car's accelerometers (or velocity sensors) to the information collected from an accelerometer in a passenger's phone to detect a velocity attack.

As a further example, the processor may collect information from a microphone (e.g., built into the vehicle, in a passenger's mobile device, etc.), collect information from an accelerometer, and use this combination of data to determine whether the vehicle is experiencing a gear attack in which the vehicle is forced to improperly shift gears. As another example, the processor may use information collected from an independent accelerometer (e.g., in a passenger's mobile device, in a wearable device, etc.) to determine whether the car's wheel rotation sensor has been hacked to report that the vehicle is going faster than allowed, which could cause the vehicle to improperly apply the brakes.

As the number of systems and sensors in each vehicle is very large, information collected from many such system may be correlated to one another. The foregoing examples are but a small subset of the number of sensors/systems that may be compared, correlated or otherwise used by the processor to monitor for attacks.

The various embodiments may be implemented and used in a variety of vehicle-based systems and solutions. For example, the various embodiments may be implemented in any computing system that controls the operations, components, sensors, features or functions of a vehicle, including the vehicle control systems of automobiles and/or server computing devices deployed in a cloud network and configured to monitor or control the operations of automobiles. While the various embodiments and implementations are particularly useful in vehicle-based systems, embodiments may be implemented and used in any system or device that includes a processor for executing application programs, a sensor for collecting data, and communications circuitry for sending and receiving information.

The various embodiments may be implemented within a variety of communication systems, such as the example vehicle-based system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.), road sensors 116, vehicles 118, and other network destinations, such as via telephone land lines (e.g., a plain ordinary telephone system (POTS) network, not shown) and the Internet 110. The telephone network 104 may also include one or more servers 114 coupled to or within the network operations center 108 that provide a connection to the Internet 110.

The vehicles 118 may include hardware and/or software components suitable for monitoring and collecting sensor information from the vehicle's various sensors. Examples of vehicle sensors that may be monitored include the vehicle's speedometer, wheel speed sensor, torquemeter, turbine speed sensor, variable reluctance sensor, sonar system, radar system, air-fuel ratio meter, water-in-fuel sensor, oxygen sensor, crankshaft position sensor, curb feeler, temperature sensor, Hall effect sensor, manifold absolute pressure sensor, fluid sensors (e.g., engine coolant sensor, transmission fluid sensor, etc.), tire-pressure monitoring sensor, mass airflow sensor, speed sensor, throttle position sensor, blind spot monitoring sensor, parking sensor, speakers, cameras, microphones, accelerometers, compasses, GPS receivers, and other similar sensors for monitoring physical or environmental conditions in and around the vehicle.

The vehicles 118 may include communications circuitry for communicating with a network server 120, which may be implemented as a server within the network infrastructure of a cloud service provider network 122 and connected to the Internet 110 and the telephone network 104. The vehicles 118 may also include communications circuitry for communicating with one or more satellite or space-based systems 124, such as a global positioning system (GPS) or another navigation or positioning system.

Communications between the network server 120, road sensors 116, and the vehicles 118 may be achieved through the telephone network 104, the Internet 110, a cloud service provider network 122, private networks (not illustrated), or any combination thereof. Communications between the vehicles 118 and the telephone network 104 may be accomplished via two-way wide-area wireless communication links 112, such as cellular telephone communication technologies. A number of different cellular and mobile communication services and standards are available or contemplated in the future, all of which may be used for communications of the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UNITS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages.

The mobile device 102 may be configured to determine whether it is inside a vehicle 118 based on information collected from the mobile device's 102 sensors. The mobile device 102 may activate a monitoring and analysis system to collect and analyze sensor information in response to determining that it is inside one of the vehicles 118. The monitoring and analysis system may monitor sensors (of the vehicle 118, in the mobile device 102, road sensor 116, etc.) to collect sensor information, analyze the collected sensor information to generate an analysis result, use the generated analysis result to determine whether a behavior of the vehicle 118 is abnormal, generate a communication message in response to determining that the behavior is abnormal, and sending the generated communication message to an external entity (e.g., network server 120, etc.).

The network server 120 may send data and control information to vehicles 118, which may receive and use the information to perform a responsive operation or provide a function. For example, each of the vehicles 118 may include an Advanced Driver Assistance System (ADASs) that is controlled by a vehicle control system. The vehicle control system may receive and use the information from the network server 120 to determine that there has been a change in circumstances (e.g., a detected hazard, a change in the traffic pattern, a road closure, etc.), and instruct the ADAS system to alter the vehicle's operations (e.g., braking, steering, etc.). The vehicle control system may also be configured to receive a control message from the network server 120, and in response, activate various sensors (e.g., accelerometer, radar, lidar, GPS receiver, roadbed sensors, etc.) to collect and send sensor information to the network server 120. In addition, the vehicle control system may be configured to collect and report vehicle information to the network server 120 periodically, on-demand, continuously, repeatedly, in response to a trigger, in response to detecting the occurrence of an event, etc.

The road sensors 116 may be configured to collect and send sensor information to the vehicles 118 or the network server 120, such as in response to receiving a control message from the network server 120, in response to receiving an information request message from the vehicles 118, in response detecting a condition or event (e.g., a sudden change in vehicle speeds, etc.), periodically, etc. The vehicles 118 may report the information received from road sensors 116 to the network server 120 or the mobile device 102, and/or use the received information to make better or more informed decisions, such whether to instruct the ADAS system to apply the brakes. The network server 120 or the mobile device 102 may use the information received from road sensors 116 (e.g., vehicle information) to make control decisions. The network server 120 or the mobile device 102 may also use the information received from road sensors 116 (e.g., sensor information) to corroborate information received from other sensors, such as the vehicle information received from the other road sensors 116 or vehicles 118.

Figure 2:
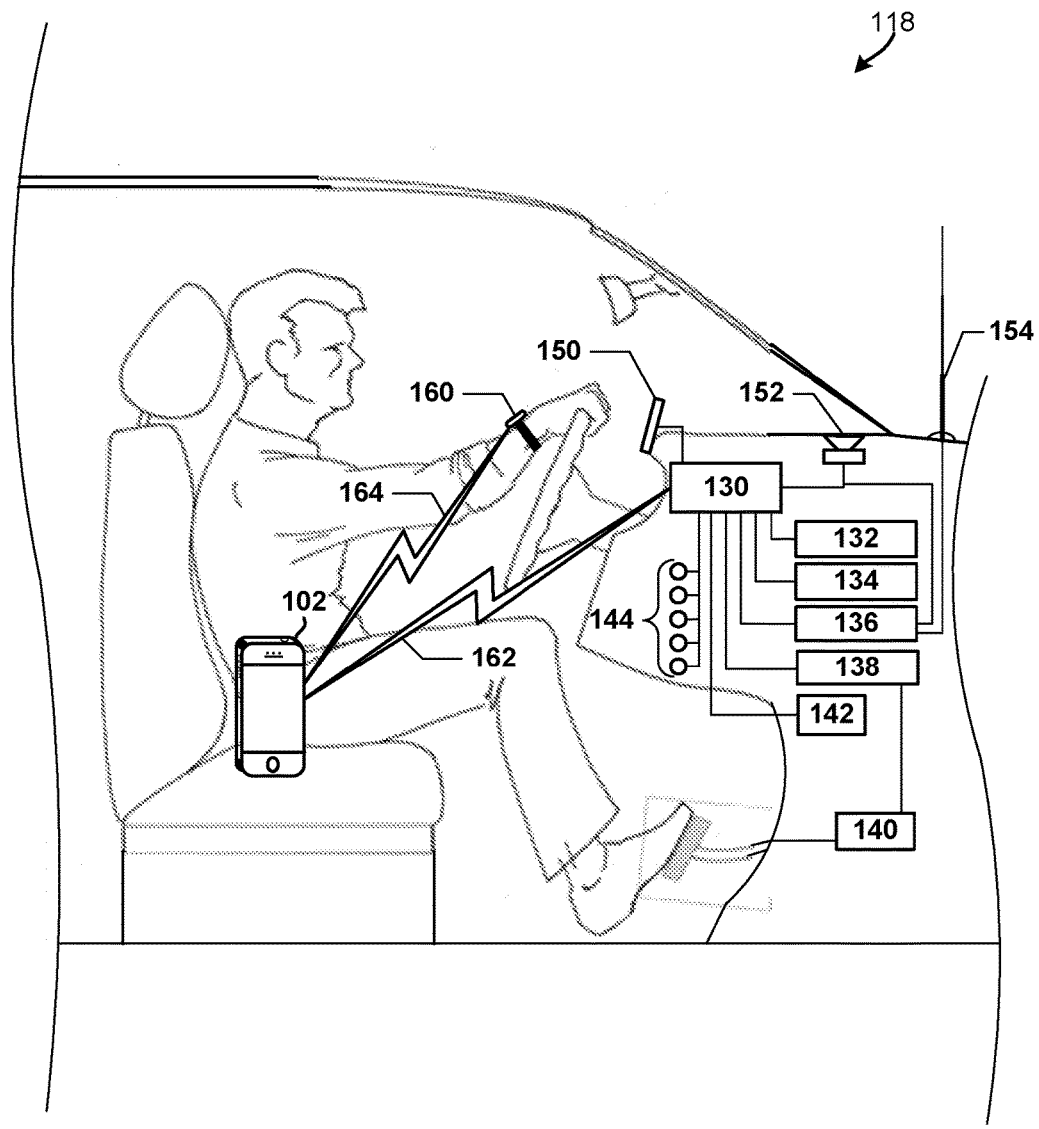
FIG. 2 is a component block diagram illustrating logical components of a vehicular control system suitable for implementing the various embodiments.

FIG. 2 is a component block diagram of an example vehicle 118 including a vehicle control system 130 and various sensors suitable for interacting with a server computing device 120 according to various embodiments. Vehicular system may include the vehicle control system 130 coupled to a variety of vehicle systems and subsystems, such as an environmental system 132 (e.g., an air conditioning system), a navigation system 134, a communications and infotainment system 136, an engine control system 138, a transmission control system 142, and a variety of sensors 144. The engine control system 138 may be coupled to one or more pedal sensors 140. The vehicle control system 130 may communicate with a server computing device 120 using the voice/data communications system 136, which may be coupled to an antenna 154 to send and receive data via various wireless wide-area networks, as well as receive wireless broadcasts. The vehicle control system 130 and the voice/data communications system 136 may be coupled to a speaker 152 to generate sound within the vehicle. The navigation system 134 may be coupled to a display 150 to display vehicle status/control and navigation information (e.g., a map). Each vehicle systems and sensors 130-144 may communicate with one or more other systems via one or more communication links, which may include wired communication links (e.g., a Controller Area Network (CAN) protocol compliant bus, Universal Serial Bus (USB) connection, Firewire connection, etc.) and/or wireless communication links (e.g., a Wi-Fi® link, Bluetooth® link, ZigBee® link, ANT+® link, etc.).

The variety of sensors 144 coupled to the vehicle control system 130 may include any of the vehicle's speedometer, a wheel speed sensor, a torquemeter, a turbine speed sensor, a variable reluctance sensor, a sonar system, a radar system, an air-fuel ratio meter, a water-in-fuel sensor, an oxygen sensor, a crankshaft position sensor, a curb feeler, a temperature sensor, a Hall effect sensor, a manifold absolute pressure sensor, various fluid sensors (e.g., engine coolant sensor, transmission fluid sensor, etc.), a tire-pressure monitoring sensor, a mass airflow sensor, a speed sensor, a blind spot monitoring sensor, a parking sensor, cameras, microphones, accelerometers, compasses, a GPS receiver, and other similar sensors for monitoring physical or environmental conditions in and around the vehicle.

In addition to the vehicle's sensors and systems 132-144, sensors included in occupant's electronic devices, such as a mobile device 102 and/or wearable devices 160, such as a smartwatch, may be polled or otherwise used to gather data in various embodiments. Mobile devices 102 and wearable devices 160 (e.g., a smartwatch) include several sensors that may sense conditions that may be beneficial for monitoring for inconsistencies in sensor data and system settings. Sensor data from mobile devices 102 and wearable devices 160 may be communicated to a vehicle control system 130 via a variety of wireless communication links 162 (e.g., Bluetooth). In embodiments in which the gathering and analysis of sensor data is implementing in a user's mobile device 102, vehicle sensor data may be communicated to the mobile device 102 via a first wireless communication link 162, and wearable device 160 sensor data may be communicated to the mobile device 102 via a second wireless communication link 164.

The aforementioned systems are presented merely as examples, and vehicles may include one or more additional systems that are not illustrated for clarity. Additional systems may include systems related additional other functions of the vehicular system, including instrumentation, airbags, cruise control, other engine systems, stability control parking systems, tire pressure monitoring, antilock braking, active suspension, battery level and/or management, and a variety of other systems.

Figure 3:
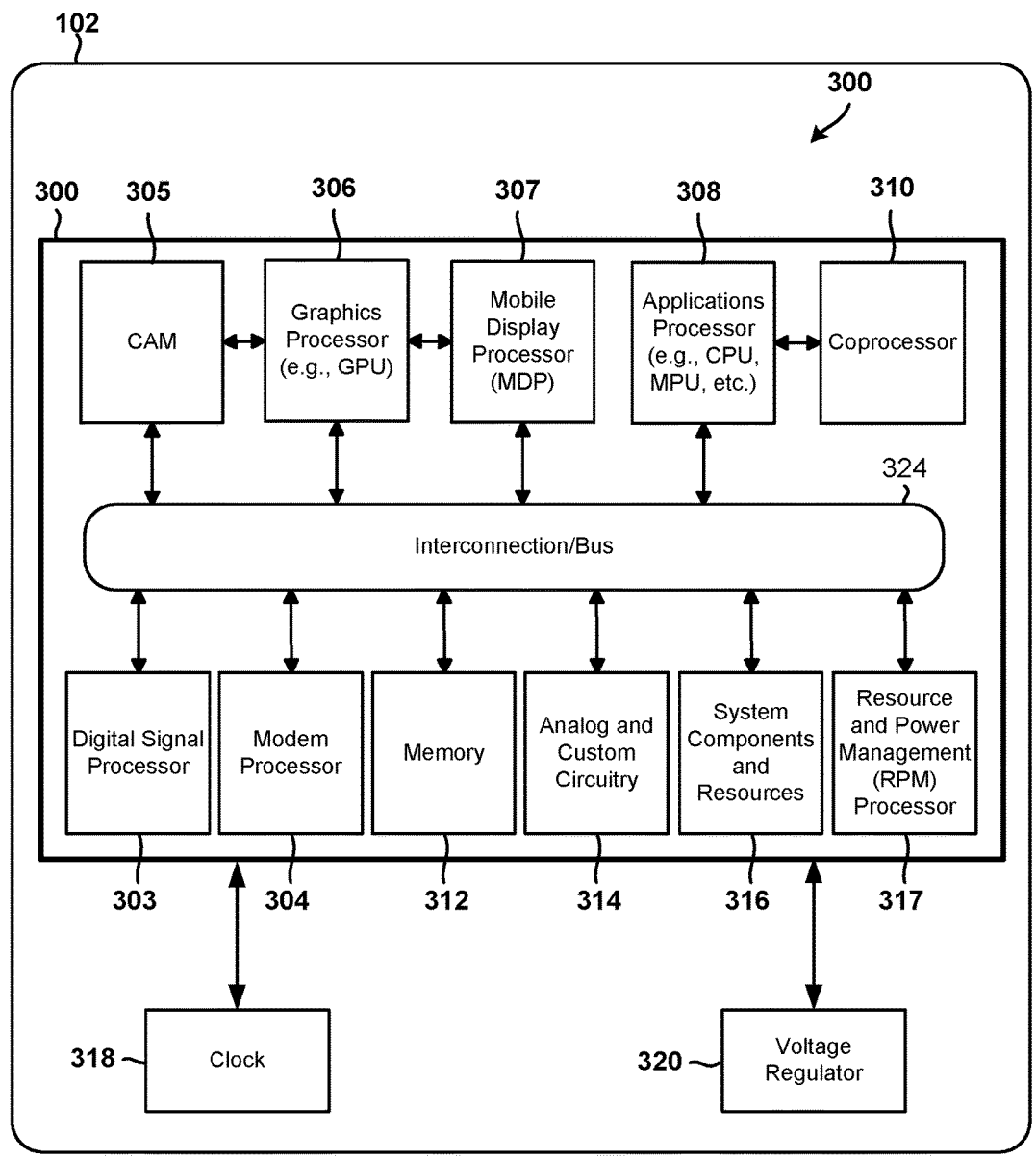
FIG. 3 is a block diagram illustrating components of an example system on chip that may be included in an embodiment computing device and configured to collect and analyze sensor information in accordance with various embodiments.

FIG. 3 illustrates an example system-on-chip (SOC) 300 architecture that may be used in mobile devices 102 implementing the various embodiments. The SOC 300 may include a number of heterogeneous processors, such as a digital signal processor (DSP) 303, a modem processor 304, a graphics processor 306, a mobile display processor (MDP) 307, an applications processor 308, and a resource and power management (RPM) processor 317. The SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The SOC 300 may include analog circuitry and custom circuitry 314 for managing sensor data, analog-to-digital conversions, wireless data transmissions, and for performing other specialized operations, such as processing encoded audio and video signals for rendering in a web browser. The SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device. The SOC 300 also include specialized circuitry (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

The system components and resources 316, analog and custom circuitry 314, and/or CAM 305 may include circuitry to interface with peripheral devices, such as cameras, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high performance networks-on chip (NoCs).

The SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In an embodiment, the SOC 300 may be included in a computing device, which may be included in an automobile. The computing device may include communication links for communication with a telephone network, the Internet, and/or a network server. Communication between the computing device and the network server may be achieved through the telephone network, the Internet, private network, or any combination thereof.

The SOC 300 may also include additional hardware and/or software components that are suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components (e.g., accelerometer, etc.) of modern electronic devices.

In addition to the mobile computing device 102 and SOC 300 discussed above, the various embodiments may be implemented in a wide variety of computing systems, which may include a single processor, multiple processors, multi-core processors, or any combination thereof.

Figure 4:
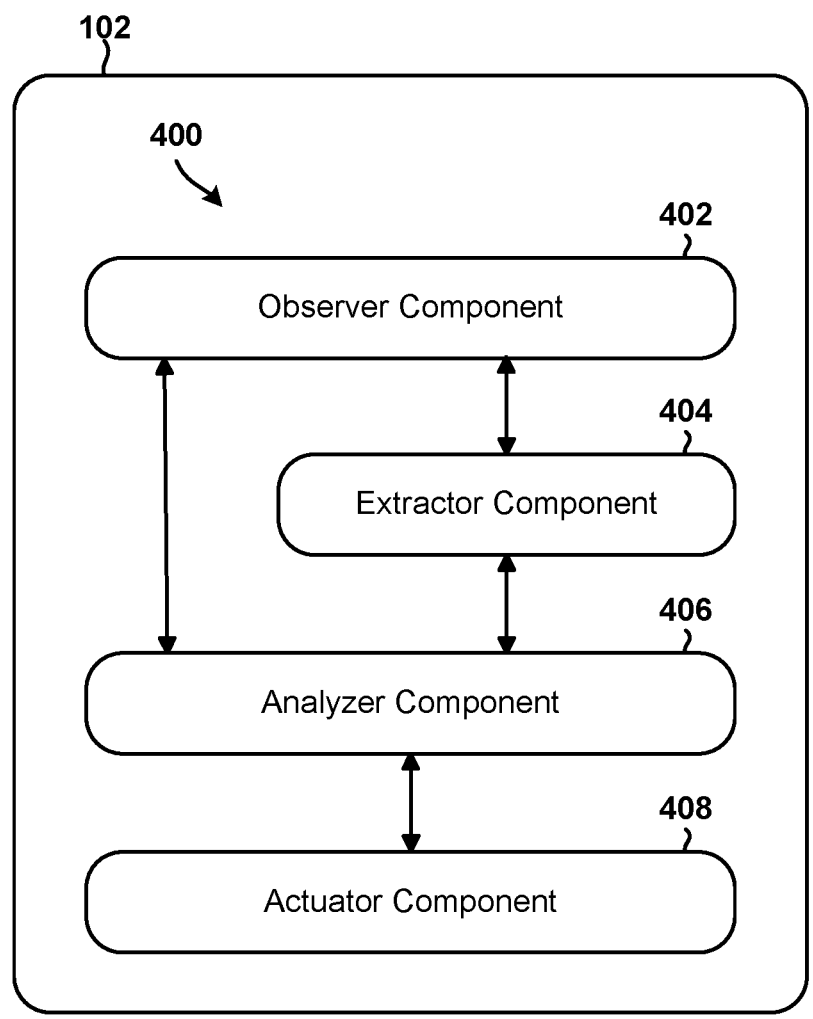
FIG. 4 is a block diagram illustrating example logical components and information flows in a mobile device configured to use behavior-based and machine learning techniques to monitor and analyze sensor information in accordance with the various embodiments.

FIG. 4 illustrates an implementation in which a mobile device 102 is equipped with a behavioral monitoring and analysis system 400 configured to perform real-time behavior monitoring and analysis operations to quickly and efficiently identify behaviors and software applications that are non-benign (or inconsistent, abnormal, malicious, etc.). By using behavior-based and machine learning techniques, the behavioral monitoring and analysis system may identify, prevent, correct, and/or otherwise respond to identified problems without having a significant, negative, or user perceivable impact on the responsiveness, performance, or power consumption characteristics of the mobile device 102. In some embodiments, the behavioral monitoring and analysis system 400 may be included in vehicle 118 and/or a vehicle control system 130 (discussed above with reference to FIG. 2).

With reference to FIG. 4, the behavioral monitoring and analysis system 400 may include an observer component 402, an extractor component 404, an analyzer component 406, and actuator component 408. The observer component 402 may be configured to collect sensor information from the various sensors and device components, and communicate the collected information to the extractor component 404.

The extractor component 404 may use the collected sensor information to generate behavior vector information structures (herein "behavior vectors") that each represent or characterizes the sensor information or a behavior associated with the collected sensor information. Each behavior vector may encapsulate one or more "features." Each feature may include an abstract number or symbol that represents all or a portion of the sensor information or the behavior associated with the collected sensor information. In addition, each feature may be associated with a data type that identifies a range of possible values, operations that may be performed on those values, meanings of the values, etc. A computing device may use the data type to determine how the feature (or feature value) should be measured, analyzed, weighted, used, etc.

The extractor component 404 may communicate (e.g., via a memory write operation, function call, etc.) the behavior vectors to the analyzer component 406, which may apply the behavior vectors to classifier models to generate analysis results that may be used to determine whether a vehicle behavior is benign or non-benign (or normal or abnormal, suspicious or not suspicious, etc.). A classifier model may be a behavior model that includes data and/or information structures (e.g., decision nodes, trees, stumps, component lists, etc.) that may be used by a computing device processor to evaluate a specific factor, feature, or embodiment of the vehicle's behavior. A classifier model may also include decision criteria for monitoring or analyzing a number of features, factors, data points, entries, APIs, states, conditions, behaviors, software applications, processes, operations, components, in the computing device.

A full classifier model may be a robust data model that is generated as a function of a large training dataset, which may include, test, or evaluate thousands of features and billions of entries. A lean classifier model may be a more focused data model that is generated from a reduced dataset that includes or prioritizes tests on the features/entries that are most relevant for determining whether a particular mobile device behavior is not benign. A locally generated lean classifier model is a lean classifier model that is generated in the computing device. A reduced feature classifier model may be a focused and lean classifier model that is generated based on a more robust classifier model to include only a subset of the decision nodes in the more robust classifier model that evaluate the features determined to be most important for determining whether a vehicle behavior is abnormal (or non-benign, etc.).

The analyzer component 406 may notify the actuator component 408 when it determines with a high degree of confidence (e.g., based on the analysis results exceeding a threshold value, etc.) that a behavior is abnormal (or non-benign, not as expected, suspicious, etc.). In response, the actuator component 408 may perform various operations to heal, cure, isolate, or otherwise fix the identified problem(s).

Monitoring, analyzing, and otherwise responding to every potential abnormal behavior may consume a significant amount of the device's limited processing, memory, or energy resources. For example, there may be thousands of features/factors and billions of data points that require monitoring or analysis. To reduce the number of features, factors and data points that require evaluation, the behavioral monitoring and analysis system may perform progressive, dynamic, and/or adaptive operations. For example, the system may be configured to use classifier models of varying levels of complexity (or "leanness") to progressively evaluate the vehicles behaviors in stages. This allows the computing system (e.g., mobile device, etc.) to forgo performing spurious operations, and reduces the number of behavior vectors that are generated or used by the system.

For example, in some embodiments, the system may be configured to generate and use a family of classifier models that includes an initial classifier model and one or more subsequent classifier models. The initial classifier model may be a lean classifier model (or a reduced features model) that focuses on evaluating a targeted subset of all the features, factors, and data points that would otherwise require analysis when classifying a behavior. Said another way, the initial classifier model may include decision nodes for evaluating an initial set of factors/features that are determined to have a high probability of enabling the system to determine whether a behavior is benign or non-benign with a high degree of confidence. Each subsequent classifier model may be a more robust classifier that includes a larger number of decision nodes and/or evaluates a larger subset of the features, factors, and data points than its preceding classifier model.

The system may apply behavior vectors to the initial classifier model to generate initial analysis results, determine whether the initial analysis results indicate whether the behavior is abnormal (or non-benign, etc.) with a high degree of confidence, classify the behavior as suspicious in response to determining that the behavior cannot be classified as either normal or abnormal with a sufficiently high degree of confidence (determined by comparing a confidence value to a threshold value, etc.), apply the same or different behavior vectors to progressively larger or more robust classifier models to generate new or additional analysis results in response to determining that the behavior is suspicious), and determine whether the new/additional analysis results indicate whether the behavior is normal or abnormal (or benign or non-benign) with a high degree of confidence (a confidence value that exceed a threshold). The system may perform these operations continuously or repeatedly until the analysis results indicate with a high degree of confidence that the behavior is normal or abnormal (or benign or non-benign), until all of the classifier models in the family have been used, until a processing or battery consumption threshold is reached, etc.

Figure 5:
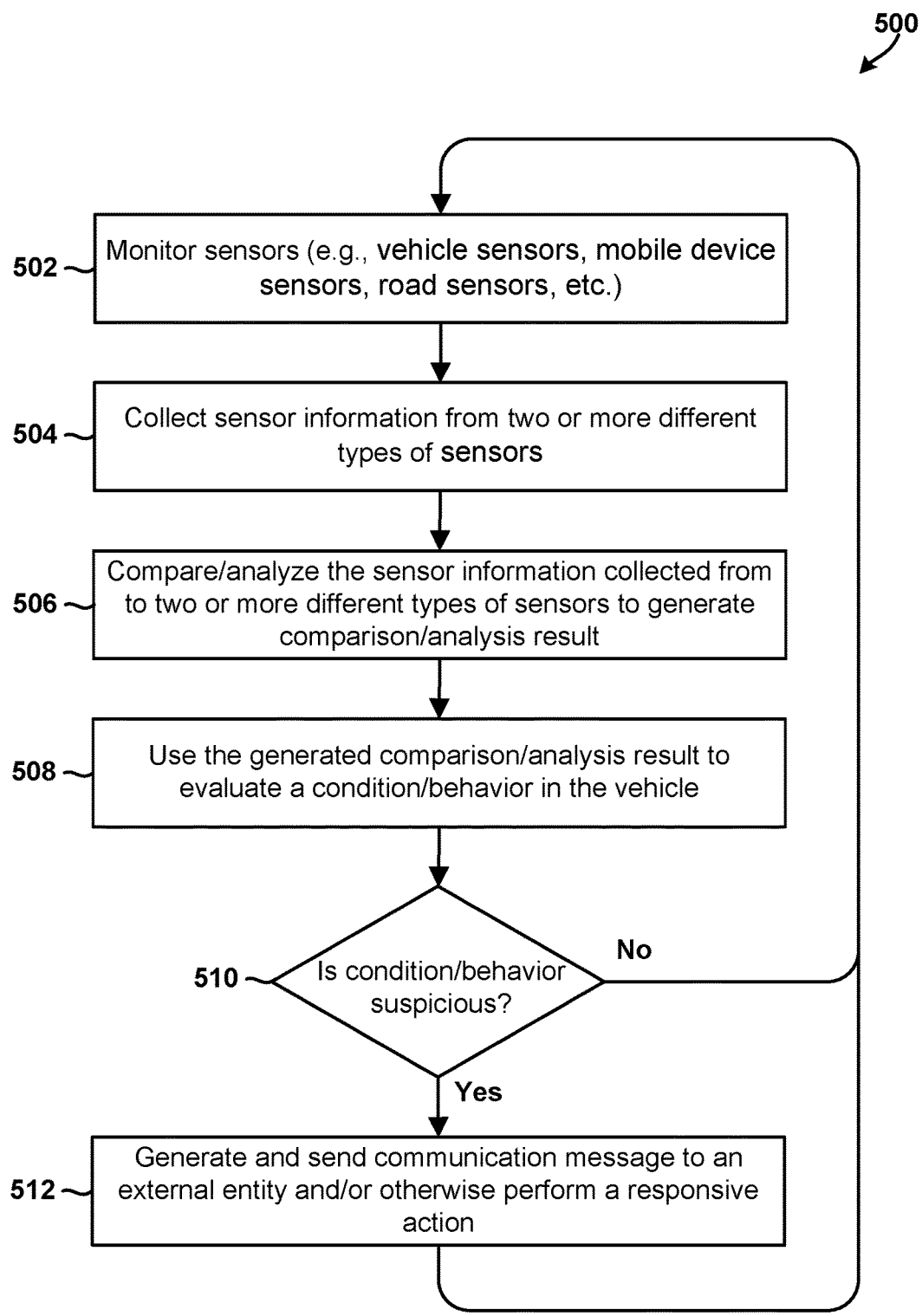
FIG. 5 is a process flow diagram illustrating a method of analyzing sensor information to identify an abnormal vehicle behavior in accordance with an embodiment.

FIG. 5 illustrates a method 500 for analyzing sensor information to identify an abnormal or suspicious vehicle behavior according to various embodiments. The method 500 may be performed by a processor or processing core (e.g., any of a vehicle control system 130 illustrated in FIG. 2, or a modem processor 304, an applications processor 308, a coprocessor 310, and a RPM processor 317 illustrated in FIG. 3) in a computing system, such as a mobile device or a vehicle control system.

In block 502, the processor may monitor a variety of independent and/or heterogeneous sensors in a vehicle, including any combination of vehicle sensors, mobile device sensors, and road sensors. In block 504, the processor may collect sensor information from two or more different types of sensors (e.g., odometer, accelerometer, etc.). In an embodiment, the processor may be configured to collect sensor data from a multitude of different sources via a CAN-bus included in the vehicle. The CAN-bus may be designed, configured or arranged to allow different types of sensors/sources to communicate and exchange sensor information. In some embodiments, the processor may be further configured to filter the collected data based on data criticality and/or based on the sensors, sources, or components that are monitored or protected. For example, in order to detect anomalous behavior on the brake or speedometer sensors, the processor may ignore or disregard information received from the climate control system so as to reduce the amount of information that is collected and analyzed, maintain a manageable set of information sources, and/or focus operations on the sensors/sources that have the highest probability of providing information useful for identifying or evaluating an anomalous behavior of the brake or speedometer sensors.

In block 506, the processor may compare or analyze sensor information collected from to two or more different types of sensors to generate comparison or analysis result. In some implementations, this comparison may include comparing sensor information collected from a mobile device sensor to sensor information collected from a vehicle sensor. In some implementations, this comparison may include comparing sensor information collected from two or more of a closely-integrated vehicle sensor, a loosely-integrated vehicle sensor, and a non-vehicle sensor. In some implementations, this comparison may include comparing sensor information collected from a first type of sensor to sensor information collected from a second, different type of sensor. By collecting data from multiple sensors from the vehicle and/or other external devices, the processor may diversify the input to a data analytic engine and/or analyzer component, and as a result, generate more accurate comparison/analysis results.

In block 508, the processor may use the generated comparison/analysis result to evaluate a condition in, or behavior of, the vehicle. In determination block 510, the processor may determine whether the condition or behavior is suspicious or abnormal based on the evaluation, comparison, or analysis results. In response to determining that the condition or behavior is not suspicious or abnormal (i.e., determination block 510="No"), the processor may continue monitoring sensors in block 502. In response to determining that the condition or behavior is suspicious or abnormal (i.e., determination block 510="Yes"), the processor may generate and send a communication message to an external entity or perform another responsive action in block 512. For example, in response to determining that the speedometer information is suspicious or anomalous in block 510, the processor may disengage the cruise control mechanism of the vehicle and render a warning message to the user, operator or, passenger of the vehicle in block 512.

Figure 6:
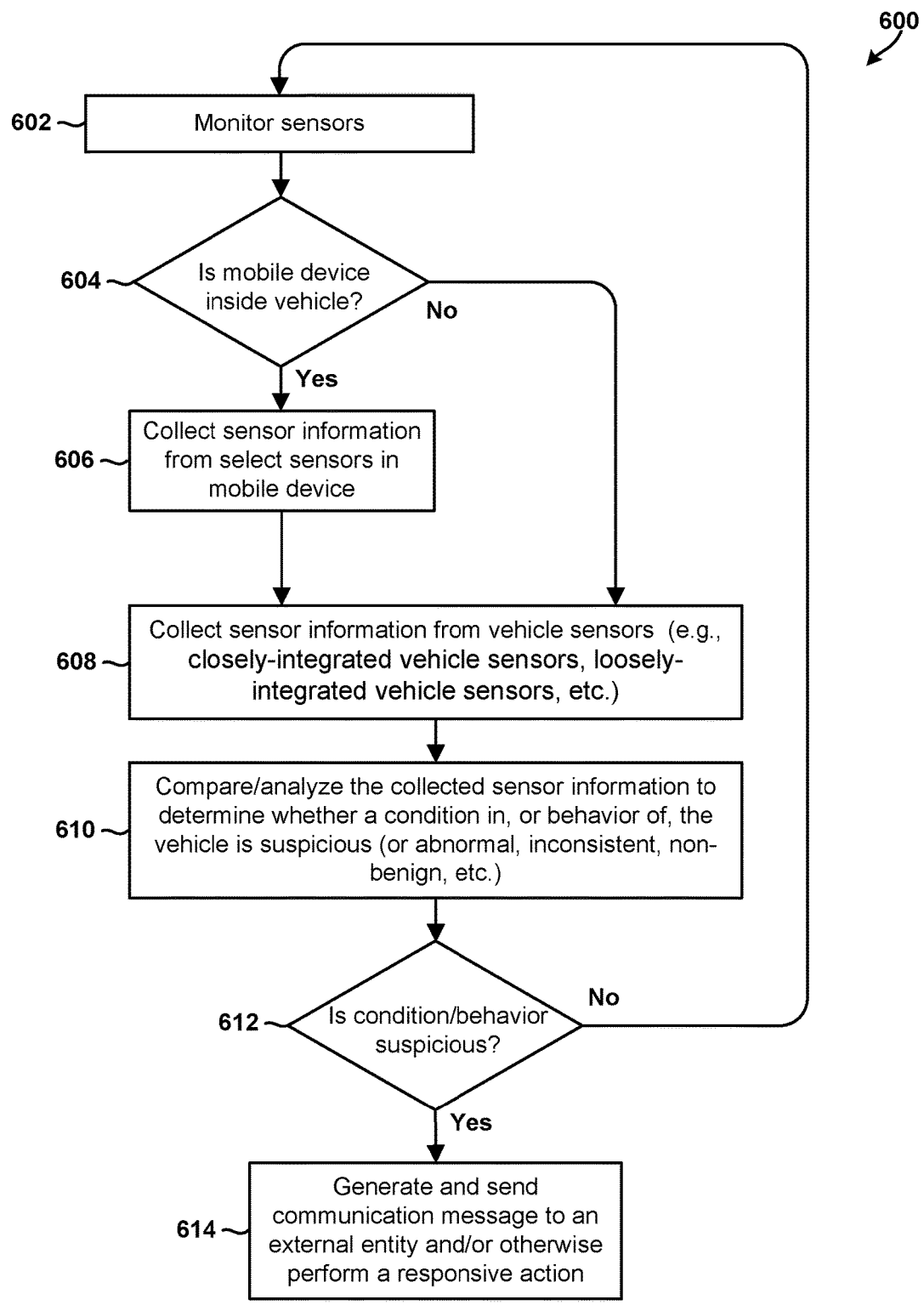
FIG. 6 is a process flow diagram illustrating a method of analyzing sensor information to identify an abnormal vehicle behavior in accordance with another embodiment.

FIG. 6 illustrates another method 600 for analyzing sensor information to identify an abnormal or suspicious vehicle behavior. Method 600 may be performed by a processor or processing core (e.g., any of a vehicle control system 130 illustrated in FIG. 2, or a modem processor 304, an applications processor 308, a coprocessor 310, and a RPM processor 317 illustrated in FIG. 3) in a computing system, such as a mobile device or a vehicle control system.

In block 602, the processor may monitor sensors to detect various events, conditions, and requests. For example, the processor may monitor communication circuitry to detect a request to establish a communication link with a mobile device or vehicle. As another example, the processor may monitor an accelerometer to detect a movement event.

In determination block 604, the processor may determine whether a mobile device is inside the vehicle (e.g., based on a connection request, movement information, etc.). For example, the processor may determine whether a new mobile device is available by detecting Bluetooth connectivity combined with detecting movement through accelerometer readings. In response to determining that the mobile device is inside the vehicle (i.e., determination block 604="Yes"), the processor may collect sensor data from selected sensors in the mobile device in block 606. Examples of sensor data that may be collected from a mobile devices include accelerometer data, GPS information, speed data, direction data, and noise level information.

In addition to gathering mobile device sensors or in response to determining that the mobile device is not inside the vehicle (i.e., determination block 604="No"), the processor may collect sensor data from selected sensors in the vehicle in block 608.

In block 610, the processor may compare or analyze the collected sensor information to determine whether a condition in, or behavior of, the vehicle is suspicious (or abnormal, inconsistent, non-benign, etc.). For example, the processor may use information collected from internal sensors of the vehicle to generate an analysis result that indicates that the windows are closed. The processor may then compare this result to analysis of noise level information collected from mobile device and speed information (detected in the mobile device and/or from a vehicle sensor) that indicate that a window or door is likely open. In response, the processor may determine that there is a discrepancy in the information, and that the condition or behavior of the vehicle is suspicious.

In determination block 612, the processor may determine whether the condition or behavior is suspicious or abnormal based on the comparison or analysis results. In response to determining that the condition or behavior is not suspicious or abnormal (i.e., determination block 612="No"), the processor may continue monitoring sensors in block 602. In response to determining that the condition or behavior is suspicious or abnormal (i.e., determination block 612="Yes"), the processor may generate and send a communication message to an external entity or perform another responsive action in block 614.

Figure 7:
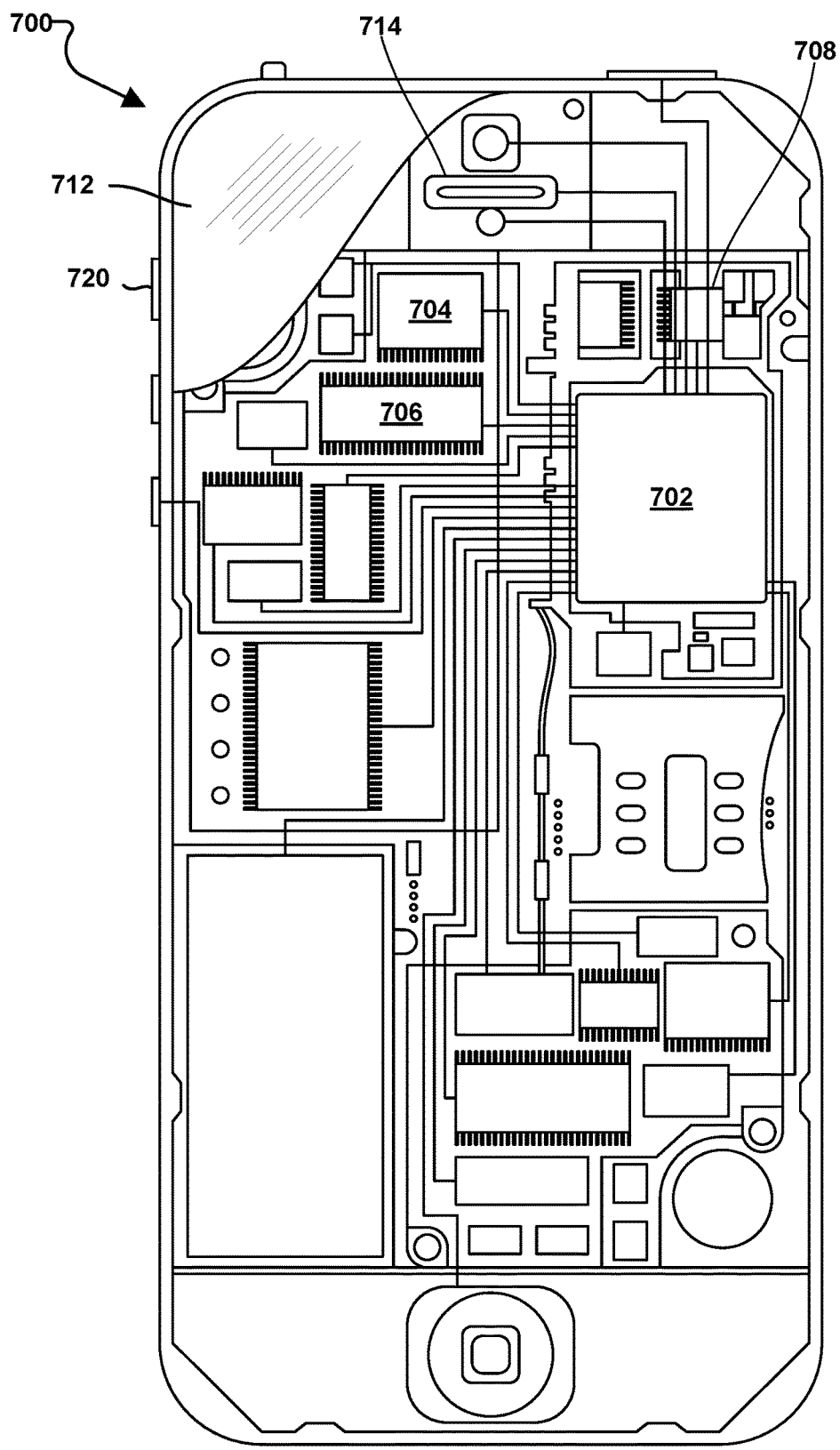
FIG. 7 is a component block diagram of a mobile device suitable for use in an embodiment.

The various embodiments may be implemented on a variety of computing devices, an example of which is illustrated in FIG. 7 in the form of a smartphone. A smartphone 700 may include a processor 702 coupled to internal memory 704, a display 712, and to a speaker 714. Additionally, the smartphone 700 may include an antenna for sending and receiving electromagnetic radiation that may be connected to a wireless data link and/or cellular telephone transceiver 708 coupled to the processor 702. Smartphones 700 typically also include menu selection buttons or rocker switches 720 for receiving user inputs.

A typical smartphone 700 also includes a sound encoding/decoding (CODEC) circuit 706, which digitizes sound received from a microphone into data packets suitable for wireless transmission and decodes received sound data packets to generate analog signals that are provided to the speaker to generate sound. Also, one or more of the processor 702, wireless transceiver 708 and CODEC 706 may include a digital signal processor (DSP) circuit (not shown separately).

The processors 702 may be any programmable microprocessor, microcomputer or multiple processor chip or chips that can be configured by software instructions (applications) to perform a variety of functions, including the functions of the various embodiments described below. In some mobile devices, multiple processors 702 may be provided, such as one processor dedicated to wireless communication functions and one processor dedicated to running other applications. Typically, software applications may be stored in the internal memory 704 before they are accessed and loaded into the processor 702. The processor 702 may include internal memory sufficient to store the application software instructions.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples, and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present claims are not intended to be limited to the embodiments shown herein but are to be accorded the widest scope consistent with the following claims and the principles and novel features disclosed herein.

What is claimed is:

1. A method of analyzing sensor information to identify an abnormal vehicle behavior, comprising:
   monitoring, via a processor, a plurality of sensors in close proximity to a vehicle to collect sensor information;
   activating a monitoring and analysis system to collect and analyze the sensor information from the plurality of sensors, the plurality of sensors including one or more of a closely-integrated vehicle sensor, a loosely-integrated vehicle sensor, or a non-vehicle sensor;
   analyzing the collected sensor information to generate an analysis result, wherein the analyzing comprises:

applying a generated behavior vector to a machine learning classifier model to generate the analysis result, wherein the generated behavior vector is based on the collected sensor information; and using the generated analysis result to determine whether a behavior of the vehicle is abnormal.

2. The method of claim 1, further comprising:

generating a communication message in response to determining that the behavior of the vehicle is abnormal; and sending the generated communication message to an external entity.

3. The method of claim 1, wherein the analyzing the collected sensor information to generate the analysis result further comprises comparing sensor information collected from a mobile device sensor to sensor information collected from a vehicle sensor.

4. The method of claim 1, wherein the analyzing the collected sensor information to generate the analysis result further comprises comparing sensor information collected from two or more of:

the closely-integrated vehicle sensor;
the loosely-integrated vehicle sensor; or
the non-vehicle sensor.

5. The method of claim 1, wherein the analyzing the collected sensor information to generate the analysis result further comprises comparing sensor information collected from a first sensor to sensor information collected from a second sensor, wherein the first sensor is different from the second sensor.

6. The method of claim 1, wherein the processor is a mobile device processor in a mobile device, the method further comprising:

determining by the mobile device processor whether the mobile device is inside the vehicle.

7. The method of claim 1, wherein the processor is a vehicle processor in the vehicle, the method further comprising:

determining by the vehicle processor whether a mobile device is inside the vehicle;

establishing a communication link to the mobile device in response to determining that the mobile device is inside the vehicle; and receiving mobile device sensor information via the communication link.

8. A computing device, comprising:

a processor configured with processor-executable instructions to perform operations comprising:

monitoring a plurality of sensors in close proximity to a vehicle to collect sensor information;

activating a monitoring and analysis system to collect and analyze the sensor information from the plurality of sensors, the plurality of sensors including one or more of a closely-integrated vehicle sensor, a loosely-integrated vehicle sensor, or a non-vehicle sensor;

analyzing the collected sensor information to generate an analysis result, wherein the analyzing comprises:

applying a generated behavior vector to a machine learning classifier model to generate the analysis result, wherein the generated behavior vector is based on the collected sensor information; and using the generated analysis result to determine whether a behavior of the vehicle is abnormal.

9. The computing device of claim 8, wherein the processor is configured with processor-executable instructions to perform operations further comprising:

generating a communication message in response to determining that the behavior of the vehicle is abnormal; and sending the generated communication message to an external entity.

10. The computing device of claim 8, wherein the processor is configured with processor-executable instructions to perform operations such that the analyzing the collected sensor information to generate the analysis result further comprises comparing sensor information collected from a mobile device sensor to sensor information collected from a vehicle sensor.

11. The computing device of claim 8, wherein the processor is configured with processor-executable instructions to perform operations such that the analyzing the collected sensor information to generate the analysis result further comprises comparing sensor information collected from two or more of:

the closely-integrated vehicle sensor;
the loosely-integrated vehicle sensor; or
the non-vehicle sensor.

12. The computing device of claim 8, wherein the processor is configured with processor-executable instructions to perform operations such that the analyzing the collected sensor information to generate the analysis result further comprises comparing sensor information collected from a first sensor to sensor information collected from a second sensor, wherein the first sensor is different from the second sensor.

13. The computing device of claim 8, wherein:

the computing device is a mobile device; and
the processor is configured with processor-executable instructions to perform operations further comprising determining whether the mobile device is inside the vehicle.

14. The computing device of claim 8, wherein:

the computing device is embedded in the vehicle; and
the processor is configured with processor-executable instructions to perform operations further comprising:

determining whether a mobile device is inside the vehicle;

establishing a communication link to the mobile device in response to determining that the mobile device is inside the vehicle; and receiving mobile device sensor information via the communication link.

15. A non-transitory computer readable storage medium having stored thereon processor-executable software instructions configured to cause a computing device processor to perform operations for analyzing sensor information to identify an abnormal vehicle behavior, the operations comprising:

monitoring a plurality of sensors in close proximity to a vehicle to collect the sensor information;

activating a monitoring and analysis system to collect and analyze the sensor information from the plurality of sensors, the plurality of sensors including one or more of a closely-integrated vehicle sensor, a loosely-integrated vehicle sensor, and a non-vehicle sensor;

analyzing the collected sensor information to generate an analysis result, wherein analyzing comprises:

applying a generated behavior vector to a machine learning classifier model to generate an analysis result, wherein the generated behavior vector is based on the collected sensor information; and using the generated analysis result to determine whether a behavior of the vehicle is abnormal.

16. The non-transitory computer readable storage medium of claim 15, wherein the stored processor-executable instructions are configured to cause the computing device processor to perform operations further comprising:
generating a communication message in response to determining that the behavior of the vehicle is abnormal; and
sending the generated communication message to an external entity.

17. The non-transitory computer readable storage medium of claim 15, wherein the stored processor-executable instructions are configured to cause the computing device processor to perform operations such that the analyzing the collected sensor information to generate the analysis result further comprises comparing sensor information collected from a mobile device sensor to sensor information collected from a vehicle sensor.

18. The non-transitory computer readable storage medium of claim 15, wherein the stored processor-executable instructions are configured to cause the computing device processor to perform operations such that the analyzing the collected sensor information to generate the analysis result further comprises comparing sensor information collected from two or more of:
the closely-integrated vehicle sensor;
the loosely-integrated vehicle sensor; or
the non-vehicle sensor.

19. The non-transitory computer readable storage medium of claim 15, wherein the stored processor-executable instructions are configured to cause the computing device processor to perform operations such that the analyzing the collected sensor information to generate the analysis result further comprises comparing sensor information collected from a first sensor to sensor information collected from a second sensor, wherein the first sensor is different from the second sensor.

20. The non-transitory computer readable storage medium of claim 15, wherein the stored processor-executable instructions are configured to cause a mobile device processor in a mobile device to perform operations comprising:
determining whether the mobile device is inside the vehicle.

21. The non-transitory computer readable storage medium of claim 15, wherein the stored processor-executable instructions are configured to cause a vehicle processor in the vehicle to perform operations comprising:
determining whether a mobile device is inside the vehicle;
establishing a communication link to the mobile device in response to determining that the mobile device is inside the vehicle; and
receiving mobile device sensor information via the communication link.

22. A computing device, comprising:
means for monitoring a plurality of sensors in close proximity to a vehicle to collect sensor information;
means for activating a monitoring and analysis system to collect and analyze the sensor information from the plurality of sensors, the plurality of sensors including one or more of a closely-integrated vehicle sensor, a loosely-integrated vehicle sensor, and a non-vehicle sensor;
means for analyzing the collected sensor information to generate an analysis result, wherein means for analyzing comprises:
means for applying a generated behavior vector to a machine learning classifier model to generate an analysis result, wherein the generated behavior vector is based on the collected sensor information; and
means for using the generated analysis result to determine whether a behavior of the vehicle is abnormal.

23. The computing device of claim 22, further comprising:
means for generating a communication message in response to determining that the behavior of the vehicle is abnormal; and
means for sending the generated communication message to an external entity.

24. The computing device of claim 22, wherein the means for analyzing the collected sensor information to generate the analysis result further comprises means for comparing sensor information collected from a mobile device sensor to sensor information collected from a vehicle sensor.

25. The computing device of claim 22, wherein the means for analyzing the collected sensor information to generate the analysis result further comprises means for comparing sensor information collected from two or more of:
the closely-integrated vehicle sensor;
the loosely-integrated vehicle sensor; or
the non-vehicle sensor.

26. The computing device of claim 22, wherein the means for analyzing the collected sensor information to generate the analysis result further comprises means for comparing sensor information collected from a first sensor to sensor information collected from a second sensor, wherein the first sensor is different from the second sensor.

27. The computing device of claim 22, wherein the computing device is a mobile device, the mobile device further comprising:
means for determining whether the mobile device is inside the vehicle.

28. The computing device of claim 22, wherein the computing device is built into the vehicle, the computing device further comprising:
means for determining whether a mobile device is inside the vehicle;
means for establishing a communication link to the mobile device in response to determining that the mobile device is inside the vehicle; and
means for receiving mobile device sensor information via the communication link.

* * * * *